(12) United States Patent
De Belen et al.

(10) Patent No.: US 10,318,125 B2
(45) Date of Patent: Jun. 11, 2019

(54) GRAPHICAL USER INTERFACE MAGNETIC PANEL

(71) Applicant: SAP SE, Walldorf (DE)

(72) Inventors: Francois De Belen, Le Chesnay (FR); Mark Taylor, Courbevoie (FR); Hector Granero, Saint-Denis (FR)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 15/250,680

(22) Filed: Aug. 29, 2016

(65) Prior Publication Data

US 2018/0059908 A1    Mar. 1, 2018

(51) Int. Cl.
| | |
|---|---|
| *G06F 17/00* | (2019.01) |
| *G06F 3/0484* | (2013.01) |
| *G06F 3/0481* | (2013.01) |
| *G06F 3/0486* | (2013.01) |
| *G06F 17/24* | (2006.01) |
| *G06F 16/957* | (2019.01) |

(52) U.S. Cl.
CPC ........ *G06F 3/04842* (2013.01); *G06F 3/0481* (2013.01); *G06F 3/0486* (2013.01); *G06F 3/04812* (2013.01); *G06F 3/04817* (2013.01); *G06F 16/9577* (2019.01); *G06F 17/246* (2013.01)

(58) Field of Classification Search
CPC .............. G06F 3/0481; G06F 3/04812; G06F 3/04817; G06F 3/04842; G06F 3/0486
See application file for complete search history.

(56) References Cited

U.S. PATENT DOCUMENTS

| | | | | |
|---|---|---|---|---|
| 5,305,435 A | * | 4/1994 | Bronson | ............... G06F 3/0481 715/775 |
| 5,371,851 A | * | 12/1994 | Pieper | ............ G01R 31/318307 345/501 |
| 5,627,954 A | * | 5/1997 | McFarland | ........... G06F 3/0481 345/668 |
| 5,644,737 A | | 7/1997 | Tuniman et al. | |

(Continued)

OTHER PUBLICATIONS

"Docking and Floating Toolbars", Microsoft Visual Studio 2015, [Online]. Retrieved from the Internet: <URL: https://msdn.microsoft.com/en-us/library/a7022c58.aspx>, Jun. 3, 2016, 4 pgs.

(Continued)

*Primary Examiner* — Cesar B Paula
*Assistant Examiner* — David Faber
(74) *Attorney, Agent, or Firm* — Schwegman Lundberg & Woessner, P.A.

(57) ABSTRACT

In an example embodiment, a first graphical layer having a plurality of edges is rendered in a graphical user interface, the first graphical layer including a first virtual button rendered at a default location and one or more pieces of information. Then a user input of selecting the first virtual button and moving the first virtual button to a new location other than the default location is detected. In response to the detecting, the new location is compared to each of the plurality of edges to determine a geometrically closest edge to the new location, and a second graphical layer is rendered on top of the first graphical layer, the second graphical layer abutting the geometrically closest edge to the new location.

17 Claims, 12 Drawing Sheets

(56) References Cited

U.S. PATENT DOCUMENTS

| | | | | |
|---|---|---|---|---|
| 5,704,050 | A * | 12/1997 | Redpath | G06F 9/451 715/764 |
| 5,923,326 | A * | 7/1999 | Bittinger | G06F 3/0481 715/805 |
| 7,181,698 | B2 | 2/2007 | Shahrbabaki et al. | |
| 8,356,258 | B2 * | 1/2013 | Matthews | G06F 3/0481 715/788 |
| 8,689,174 | B2 | 4/2014 | Shaburov et al. | |
| 8,739,038 | B2 | 5/2014 | McCormack et al. | |
| 9,185,062 | B1 * | 11/2015 | Yang | H04L 51/046 |
| 2003/0202002 | A1 * | 10/2003 | Kethireddy | G06F 17/30864 715/705 |
| 2003/0210274 | A1 * | 11/2003 | Subrannanian | G06F 3/0481 715/809 |
| 2006/0123357 | A1 * | 6/2006 | Okamura | G06F 3/0482 715/786 |
| 2007/0044035 | A1 * | 2/2007 | Amadio | G06F 3/0481 715/781 |
| 2010/0211902 | A1 * | 8/2010 | Unsworth | G06F 3/03545 715/769 |
| 2011/0087984 | A1 | 4/2011 | Jitkoff et al. | |
| 2011/0119609 | A1 * | 5/2011 | Bhatt | G06F 3/0481 715/765 |
| 2014/0068424 | A1 * | 3/2014 | Dhanani | G06F 3/0483 715/251 |
| 2014/0258903 | A1 * | 9/2014 | Kanbara | G06F 3/0488 715/765 |
| 2014/0298258 | A1 * | 10/2014 | Doan | G06F 9/4443 715/810 |
| 2014/0310647 | A1 * | 10/2014 | Luan | G06F 3/0481 715/799 |
| 2015/0186351 | A1 * | 7/2015 | Hicks | G06F 17/241 715/232 |

OTHER PUBLICATIONS

Sapounakis, Erietta, "Facebook chat bubble—drag where to close?", [Online]. Retrieved from the Internet: <URL: http://www.eriontheinterweb.com/2013/06/facebook-chat-bubble-drag-where-to-close/>, Jun. 30, 2013, 7 pgs.

* cited by examiner

| MONTH | PERIOD | DEBIT | CREDIT | BALANCE | CUMULATIVE BALANCE | SALES/ PURCHASES | IMPUTED INTEREST |
|---|---|---|---|---|---|---|---|
| OPENING BAL... | OPEN... | | | | 451.777,46 | | |
| JANUARY | 01 | 986.914,11 | 433.933,00 | 552.981,11 | 1.004.758,57 | 829.414,11 | 4.795,01 |
| FEBRUARY | 02 | 91.683,00 | 32.408,27 | 59.273,73 | 1.064.032,30 | 84.150,00 | 157,61 |
| MARCH | 03 | 60.643,00 | 14.330,00 | 45.713,00 | 1.109.745,30 | 60.043,00 | 319,28 |
| ... | | ... | ... | ... | ... | ... | ... |

FIG. 3

DISPLAY CUSTOMER BALANCES

VARIANT: 308 CUSTOMER: *COMPANY CODE: *FISCAL YEAR:
TEST2 XXXX 2014

(BALANCES) SPECIAL G/L COMPARE  RESET  SEARCH

CURRENCY: EUR

| MONTH | PERIOD | OPENING BALANCE | DEBIT | CREDIT | BALANCE | CUMULATIVE BALANCE | SALES/ PURCHASES | IMPUTED INTEREST |
|---|---|---|---|---|---|---|---|---|
| OPENING BAL... | | | | | 457.46 | | | |
| JANUARY | 01 | 986.914,11 | 433.933,00 | 552.981,11 | 1.004.758,57 | | 829.414,11 | 4.795,01 |
| FEBRUARY | 02 | 91.683,00 | 32.408,27 | 59.273,73 | 1.064.032,30 | | 84.150,00 | 157,61 |
| MARCH | 03 | 60.643,00 | 14.330,00 | 45.713,00 | 1.109.745,30 | | 60.043,00 | 319,28 |
| ... | | ... | ... | ... | ... | | ... | ... |

SEND CORRESPONDENCE

*FIG. 5*

| | | | | | | | | | |
|---|---|---|---|---|---|---|---|---|---|
| | | | | DISPLAY CUSTOMER BALANCES | | | 310 | Q 🔍 Peter | ∨ |
| VARIANT: 308 | CUSTOMER: | | | *COMPANY CODE: | | | *FISCAL YEAR: 2014 | RESET | SEARCH |
| TEST2 ∨ | | | | XXXX | | | | | |
| BALANCES SPECIAL G/L COMPARE | | | | | | | | | |
| CURRENCY: EUR | | | | | | | | | ⚙ |
| MONTH | PERIOD | DEBIT | CREDIT | BALANCE | CUMULATIVE BALANCE | SALES/ PURCHASES | IMPUTED INTEREST | | |
| OPENING BAL... | OPEN... | | | | 451.777,46 | | | | |
| JANUARY | 01 | 986.914,11 | 433.933,00 | 552.981,11 | 1.004.758,57 | 829.414,11 | 4.795,01 | | |
| FEBRUARY | 02 | 91.683,00 | 32.408,27 | 59.273,73 | 1.064.032,30 | 84.150,00 | 157,61 | | |
| MARCH | 03 | 60.643,00 | 14.330,00 | 45.713,00 | 1.109.745,30 | 60.043,00 | 319,28 | | |
| ... | ... | ... | ... | ... | ... | ... | ... | | |
| | | | | | | | SEND CORRESPONDENCE | | |

*FIG. 9*

GRAPHICAL USER INTERFACE MAGNETIC PANEL

TECHNICAL FIELD

This document generally relates to systems and methods for graphical user interfaces in computer systems. More specifically, this document relates to a graphical user interface magnetic panel.

BACKGROUND

Graphical user interfaces (GUIs) allow users to interact with electronic devices, such as computers and mobile devices, through graphical icons and visual indicators, as opposed to text-based interfaces, which rely on typed command labels or text navigation. GUIs have become the predominant mechanism to interface with electronic devices. GUIs may be built into an operating system of a device, but may also be built into individual applications running in the operating system. One such individual application is a web browser, which in combination with a web page accessed by the web browser via the Internet, can render a GUI within the GUI of the operating system in which the web browser is operating. While the web browser GUI operates within the confines of the operating system GUI, it is a separate GUI with its own distinct functionality.

It is sometimes desirable for a GUI to render multiple layers of information. For example, a web browser/web page combination may render a first layer depicting various pieces of information, and when the user selects one piece of information, it may be desirable to render a second layer of information to provide additional information on the selected piece of information. This second layer is sometimes called a "pop-up" (also known as a "pop-over").

One issue that arises with such multiple layers is that the layers are often rendered as opaque, obscuring any layers below them. For example, a pop-up layer may completely cover any information in the first layer over which the pop-up layer is rendered. This can make it somewhat restrictive to design a web page or other GUI, as the programmer takes steps to ensure that whenever a pop-up layer is launched it is not rendered over any part of the first layer that cannot be hidden. This can be cumbersome as each individual page/screen of a GUI may have different information on it, in different locations, and with various degrees of importance.

Furthermore, it can be challenging for a user to switch back and forth between layers. Unlike windows displayed in an operating system GUI, which commonly are accompanied by tabs on the bottom of the GUI that the user can use to navigate to a window that is not currently visible on the display, there is no easy way for a user to navigate back and forth between layers in an application GUI. For example, while a user may be able to easily launch a pop-up layer by selecting a piece of information or graphical element on a first layer, the user must then close the pop-up layer to view or interact with the portion of the first layer that is beneath the pop-up layer. This can be cumbersome for the user.

What is needed is a solution that addresses these issues.

BRIEF DESCRIPTION OF DRAWINGS

The present disclosure is illustrated by way of example and not limitation in the figures of the accompanying drawings, in which like references indicate similar elements.

FIG. 3 is a screen capture illustrating the graphical user interface in a state where a first virtual button is at a default location, here depicted as at the top of a first layer in a toolbar, in accordance with an example embodiment.

FIG. 5 is a screen capture illustrating the graphical user interface after the user has performed a selection action on the first virtual button accompanied by a moving operation, in accordance with an example embodiment.

FIG. 9 is a screen capture illustrating the graphical user interface after the user has selected an area within the first layer, such as a piece of information.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a virtual button in a first layer of a GUI is selected to launch a second layer, which is rendered as a "magnetic panel." The magnetic panel is rendered as abutting the edge of the GUI that is nearest geometrically to the virtual button. The virtual button is "draggable", in that a user is able to select the virtual button (e.g., by "clicking" on it) and move the virtual button around in the GUI (e.g., by "dragging" it). The magnetic panel is then re-rendered if the moving of the virtual button causes the virtual button to be geometrically closer to a different edge of the GUI. Thus, it is termed a "magnetic panel" because it gives the appearance of magnetically sticking the second layer to the edge of the GUI that is closest to the moved virtual button.

Figure 1:
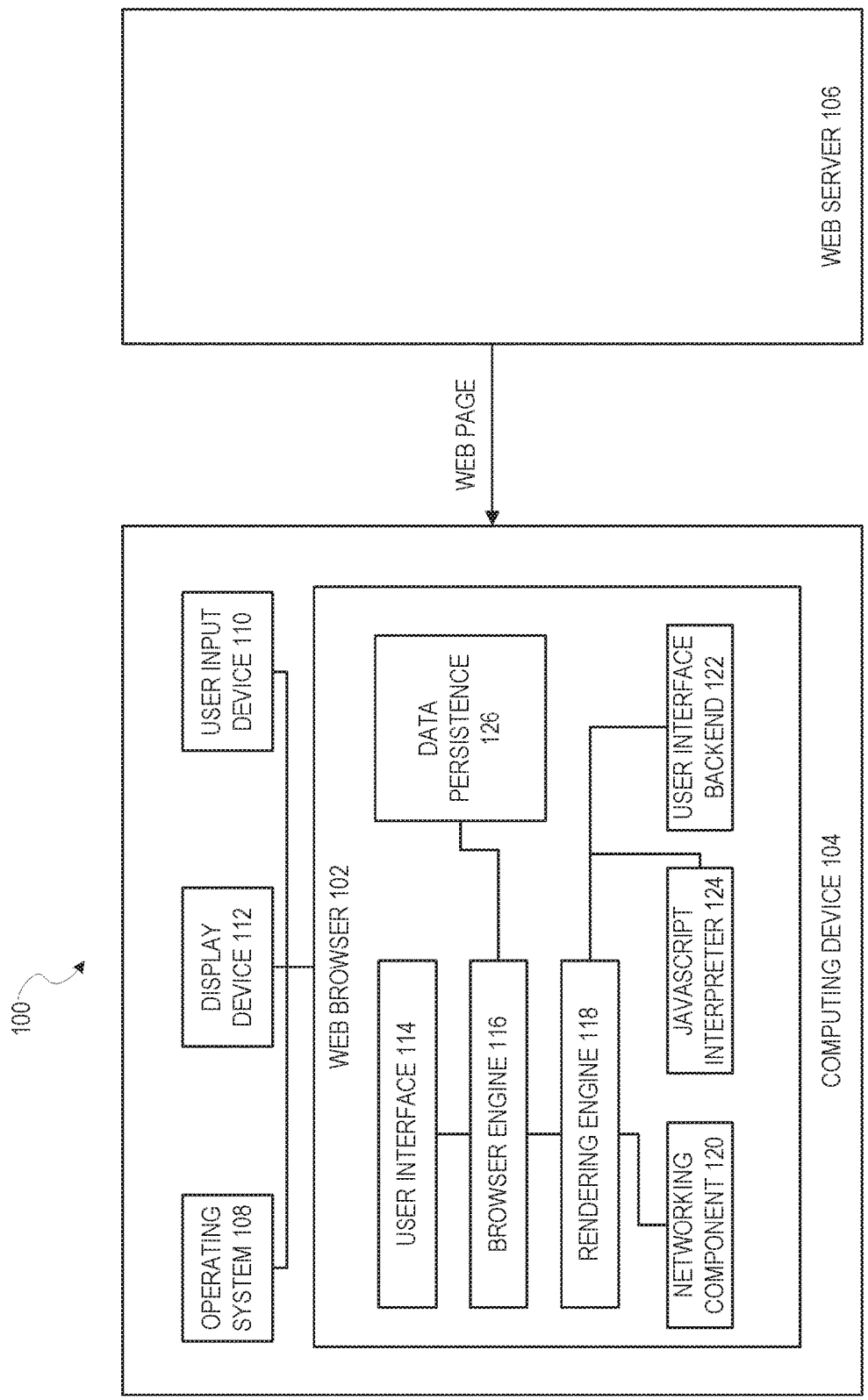
FIG. 1 is a block diagram illustrating a system including a web browser, in accordance with an example embodiment.

FIG. 1 is a block diagram illustrating a system 100 including a web browser 102, in accordance with an example embodiment. The system 100 represents one example system that can be used to implement the magnetic panel. Specifically, in this embodiment, the magnetic panel is implemented as a Javascript or similar scripting language element, executed in the web browser 102 on a computing device 104. Other example systems on which the magnetic panel may be implemented will be discussed in more detail later. For ease of discussion, many of the aspects of the magnetic panel will be discussed in terms of this Javascript or similar scripting language implementation. Nevertheless, these aspects could also be implemented on the other example systems described later, and nothing in this disclosure should be interpreted as limiting these aspects to the Javascript or similar scripting language implementation.

The computing device 104 may be, for example, a desktop computer, laptop computer, tablet computer, smart phone, smart watch, or any other computing device capable of displaying a graphical user interface via a scripting language and web browser combination. It should be noted, however, that in fact the further systems described later need not be limited to those computing devices capable of displaying a graphical user interface via a scripting language and web browser combination and can, in fact, include any computing devices capable of displaying a graphical user interface.

The system 100 includes the computing device 104 as well as a web server 106. The web server 106 delivers a web page to the computing device 104 upon request. This request may either be explicit by the user of the computing device 104, such as by navigating the web browser 102 to a specific web address, or may be implicit or automatic. The web page may, for example, be in the form of Hypertext Markup Language (HTML) code or other markup language code, which may incorporate various calls and/or scripts through languages such as Cascading Style Sheets (CSS) and Javascript.

An operating system 108 on the computing device 104 controls interactions between the web browser 102 and a user input device 110. In other words, the operating system 108 can detect when a user interacts with the web browser 102 via input to the user input device 110 and transmit such interactions to the web browser 102. Examples of user input devices 110 include mice, keyboards, touchpads, touchscreens, microphones, and any other device capable of receiving user input. The web browser 102 can output rendered GUI elements on a display device 112 of the computing device 104. In some example embodiments, the display device 112 and the user input device 110 are the same device, such as in the case of a touchscreen.

The web browser 102 contains its own user interface 114 (which may display, for example, an address bar, back/forward button, bookmarking menu, etc.). A browser engine 116 marshals actions between the user interface 114 and a rendering engine 118. The rendering engine 118 is responsible for rendering content (e.g., web pages). The rendering engine 118 may contain one or more specialized parsers (e.g., HTML parser, CSS parser) for this purpose.

A networking component 120 handles calls such as HTTP to and from the web server 106, using different implementations based on the platform, typically behind a platform-independent interface. A user interface backend 122 handles drawing basic web page components such as buttons and windows. A Javascript interpreter 124 is used to parse and execute Javascript code found in a web page parsed by the rendering engine 118. Finally, a data persistence layer 126 allows the web browser 102 to save various types of data locally, such as cookies.

In an example embodiment, specialized Javascript code is provided to the Javascript interpreter 124, either via a downloaded web page or by directly modifying one or more Javascript libraries utilized by the Javascript interpreter 124, which causes modification of a virtual button GUI element in the user interface backend 122. This modification causes the corresponding virtual button element to, when displayed, act in a dynamic manner in response to a user action to launch, move, and/or close a magnetic panel in the GUI. These modifications may include, or precede, various modifications of the underlying layer underneath the magnetic panel, including creation of "hot zones," which will be described in more detail below.

Figure 2:
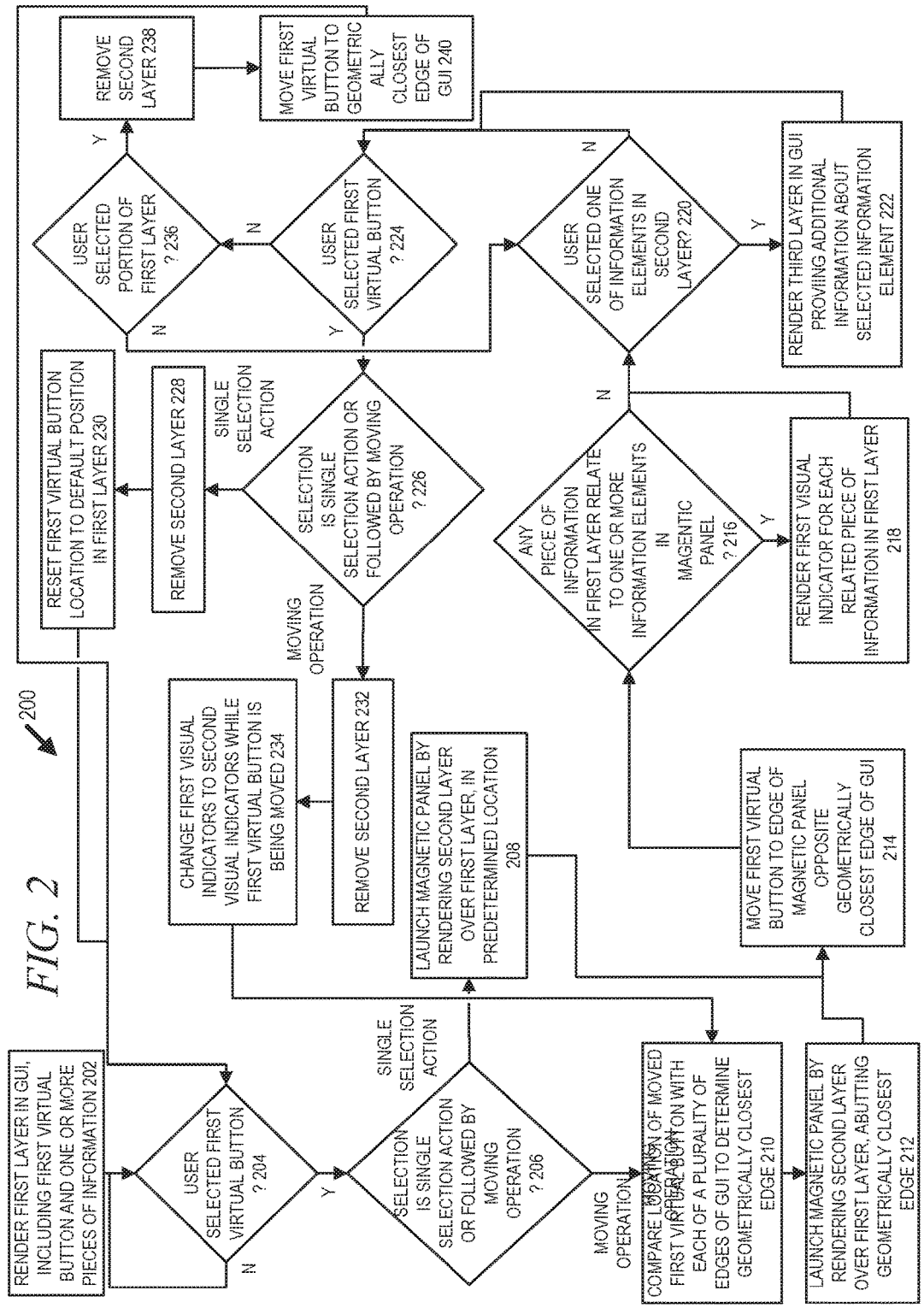
FIG. 2 is a flow diagram illustrating a method, in accordance with an example embodiment, of rendering a magnetic panel in a graphical user interface on an electronic device.

FIG. 2 is a flow diagram illustrating a method 200, in accordance with an example embodiment, of rendering a magnetic panel in a graphical user interface on an electronic device. The graphical user interface has a plurality of edges. In an example embodiment, the graphical user interface is a rectangle and thus has four edges (top, bottom, left, right). In another example embodiment, the graphical user interface has fewer or more than four edges. In some example embodiments, while the graphical user interface may not itself technically have more than one edge (such as in the case of circular or oval graphical user interfaces), the edge is split into multiple edges for operation with the method 200 (e.g., the perimeter of a circle, which some may consider to be a single edge, may be divided into four quadrants, the quadrants being the portions of the perimeter located at the top, bottom, left, and right of the circle).

At operation 202, a first layer is rendered in the graphical user interface, the first layer including a first virtual button and one or more pieces of information. The first virtual button may be rendered at a default position such as, for example, at the top of the first layer in a toolbar.

At operation 204, it is determined if a user has selected the first virtual button (such as by "clicking" on the first virtual button through a mouse, keyboard, or other user input action). If so, then at operation 206 it is determined whether the selection is a single selection action or is followed by a moving operation. A single selection action is one in which the user selects the first virtual button but does not attempt to move the first virtual button in the graphical user interface. This is most commonly accomplished by "single clicking" the first virtual button, involving, for example, when the input device is a mouse, depressing a mouse button when a cursor is over the first virtual button and then releasing the mouse button without moving the mouse; however, one of ordinary skill in the art will recognize that there may be many ways a graphical user interface can be designed to allow a user to perform a single selection action. A moving operation is one in which the user moves the first virtual button in the graphical user interface. This is most commonly accomplished by "clicking and dragging" the first virtual button by, for example, when the input device is a mouse, depressing a mouse button when a cursor is over the first virtual button; moving the mouse, causing the first virtual button to move in the graphical user interface in correlation with the movements of the mouse, and then releasing the mouse button when the first virtual button is in a desired located of the graphical user interface. One of ordinary skill in the art will recognize, however, that there may be many ways a graphical user interface can be designed to allow a user to perform a moving action.

If at operation 206 it is determined that the selection is a single selection action, then at operation 208, a magnetic panel is launched by rendering a second layer over the first layer in the graphical user interface, in a predetermined location. This location may be, for example, at the top of the graphical user interface, although in some example embodiments the location may abut an edge of the graphical user interface that is the closest geometrically to the first virtual button. In an example embodiment, the launching of the magnetic panel in operation 208 is performed using a scroll-in animation, where the magnetic panel progressively moves more and more into the graphical user interface until it is completely displayed in the graphical user interface, making it appear visually as if the magnetic panel has traveled into the boundaries of the graphical user interface from outside the boundaries of the graphical user interface.

If at operation 206 it is determined that the selection is followed by a moving operation, then at operation 210, the location of the moved first virtual button (after the moving operation is complete) is compared with each of the plurality of edges of the graphical user interface to determine which edge is geometrically closest to the location of the moved first virtual button. Then, at operation 212, a magnetic panel is launched by rendering a second layer over the first layer in the graphical user interface, with the magnetic panel abutting the geometrically closet edge. At operation 214, the first virtual button is moved to the edge of the magnetic panel opposite the geometrically closest edge of the GUI.

In both operations 208 and 212, the magnetic panel is rendered as having one or more information elements. In some example embodiments, the magnetic panel itself is the same when rendered in either operation 208 or 212, although its location may change.

In some example embodiments, the magnetic panel may have a different size and/or shape depending upon which edge it is rendered as abutting. Specifically, in some example embodiments, the edge of the magnetic panel abutting the edge of the graphical user interface has the same length as the edge of the graphical user interface it abuts.

At operation 216, it is determined if any of the pieces of information in the first layer are related to one or more information elements in the magnetic panel. A piece of information in the first layer is related to an information element in the magnetic panel if the information element provides additional information about the piece of information and/or refers to it in any way. An example would be if the information element in the magnetic panel is a help topic providing guidance involving the piece of information in the first layer. If so, then any such piece of information in the first layer is termed a "hot zone" and at operation 218 a first visual indicator is rendered for each of these hot zone pieces of information. This first visual indicator may be, for example, a highlighting or circling of the hot zone pieces of information in the first layer. Notably, as will be described later, should the user further move the first virtual button, the first visual indicator may change to a second visual indicator while the first virtual button is being moved.

At operation 220, it is determined if one of the information elements in the second layer is selected. If so, then at operation 222 a third layer is rendered in the graphical user interface, the third layer providing additional information about the selected information element.

At operation 224, it is determined if a user has selected the first virtual button (such as by "clicking" on the first virtual button through a mouse, keyboard, or other user input action). If so, then at operation 226, it is determined whether the selection is a single selection action or is followed by a moving operation. If it is a single selection action, then at operation 228 the second layer is removed from the graphical user interface. At operation 230, a location of the first virtual button is reset to the default position in the first layer. Then the method 200 may return to operation 204.

If at operation 228 it is determined that the selection is followed by a moving operation, then at operation 232 the second layer is removed from the graphical user interface. Then at operation 234, the first visual indicators of any hot zone pieces of information in the first layer are changed to second visual indicators while the first button is being moved. Then the method may return to operation 210.

If at operation 224 it is determined that the user has not selected the first virtual button, then at operation 236 it is determined if the user has selected a portion of the first layer. If so, then at operation 238 the second layer is removed from the graphical user interface. Then, at operation 240, the virtual button is automatically moved to the edge of the graphical user interface that is closest geometrically to its current position. The method 200 then returns to operation 204.

If at operation 236 it is determined that the user has not selected a portion of the first layer, then the method 200 returns to operation 220.

It should be noted that when the present disclosure discusses the concept of removing the second layer, this language is not intended to be limiting as to how the second layer is removed. Specifically, while in some example embodiments the removing of the second layer may involve purging information about the second layer from a memory or otherwise deleting the second layer from existence, in other example embodiments the removing of the second layer may involve simply rendering the second layer invisible (such as by making it completely transparent or putting it behind the first layer) while it still technically remains a layer in the graphical user interface.

In some example embodiments, operations 236-240 are modified to allow a user to select a portion of the first layer without causing the second layer to be removed. Specifically, in some example embodiments, actions taken by the user in the first layer may dynamically modify information elements in the second layer, and vice-versa. Thus, for example, if the user selects a piece of information in the first layer, the information elements in the second layer may be modified to include an information element related to the selected piece of information in the first layer. Likewise, selection of an information element in the second layer may cause the first layer to be modified to treat a piece of information related to the information element as a hot zone piece of information, thus rendering it with a first or second visual indicator.

FIGS. 3-9 are screen captures illustrating an example of a graphical user interface 300 having a magnetic panel, in accordance with an example embodiment. FIG. 3 is a screen capture illustrating the graphical user interface 300 in a state where a first virtual button 302 is at a default location, here depicted as at the top of a first layer 304 in a toolbar 306. As can be seen, the first layer 304 includes multiple pieces of information, such as a piece of information 308, being a "balances" tab, and a piece of information 310, being a fiscal year field.

Figure 4:
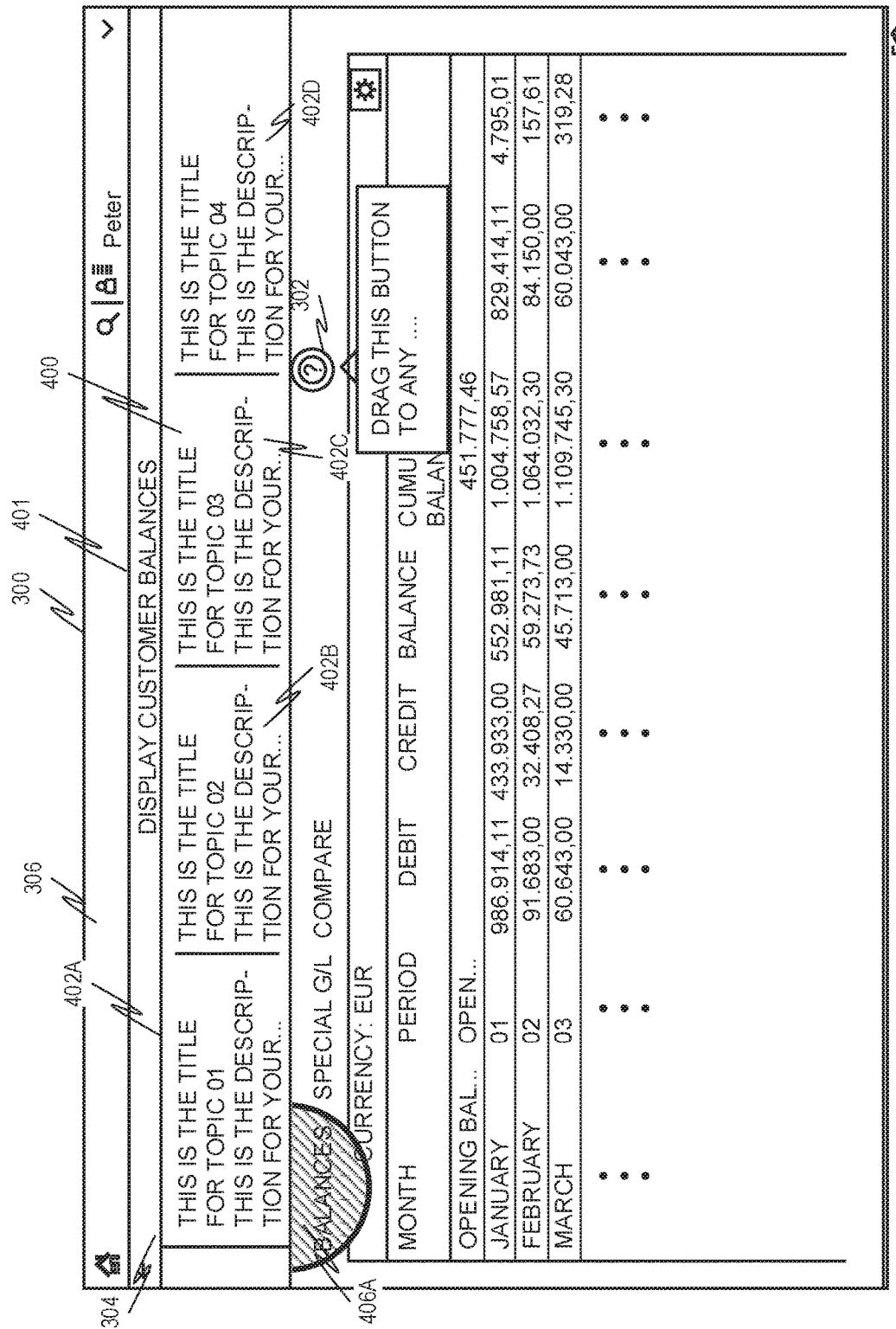
FIG. 4 is a screen capture illustrating the graphical user interface after the user has performed a single selection action on the first virtual button, in accordance with an example embodiment.

FIG. 4 is a screen capture illustrating the graphical user interface 300 after the user has performed a single selection action on the first virtual button 302, in accordance with an example embodiment. A second layer 400 has been rendered including a magnetic panel abutting the top edge 401 of the graphical user interface 300 and extending the length of the top edge of the graphical user interface 300. The second layer 400 includes information elements 402A-402D. The first virtual button 302 has been automatically moved to the bottom of the second layer 400. Additionally, first visual indicators, including a first visual indicator 406A, have been displayed over pieces of information related to the information elements 402A-402D, including the piece of information 308. Notably, a visual indicator may also be displayed over the piece of information 310 (not pictured in FIG. 4), but this may be obscured by the second layer 400.

FIG. 5 is a screen capture illustrating the graphical user interface 300 after the user has performed a selection action on the first virtual button 302 accompanied by a moving operation, in accordance with an example embodiment. Here, the user has "dragged and dropped" the first virtual button 302 to the position displayed in FIG. 5. Notably, during the dragging and dropping operation, the second layer is removed and second visual indicators 500A, 500B have replaced the first visual indicator 406A previously displayed over the pieces of information 308, 310, respectively. Here, the first visual indicator 406A was a single circle in a first color, around each of the pieces of information 308, 310, while the second visual indicators 500A, 500B are now concentric circles in a second color, around each of the pieces of information 308, 310.

Since the first virtual button 302 is now geometrically closest to a right edge 502 of the graphical user interface 300, it is determined that the magnetic panel in the second layer 400 will be rendered as abutting the right edge 502 of the graphical user interface 300.

Figure 6:
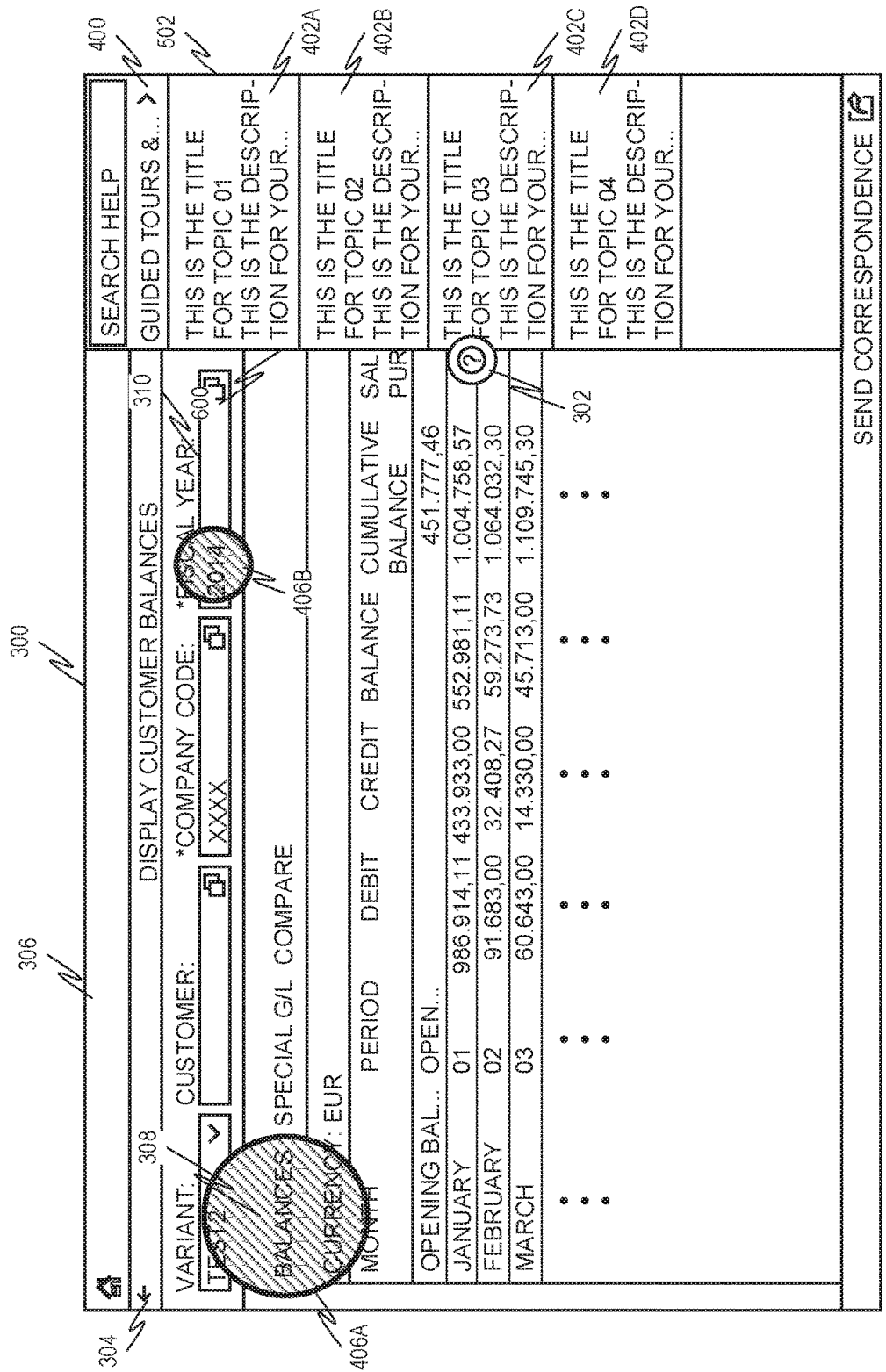
FIG. 6 is a screen capture illustrating the graphical user interface after the user has completed the moving operation, in accordance with an example embodiment.

FIG. 6 is a screen capture illustrating the graphical user interface 300 after the user has completed the moving operation, in accordance with an example embodiment. Here, the second layer 400 has been rendered as abutting the right edge 502 of the graphical user interface 300, and the first virtual button 302 has been automatically moved to the edge 600 of the second layer 400 opposite to the right edge 502 of the graphical user interface 300 that the second layer 400 abuts. The shape and size of the second layer 400 are also now different than they were in FIG. 4, reflecting the same length as the right edge 502. The information elements 402A-402D have also been reoriented and spaced in accordance with the new shape and size of the second layer 400. In some example embodiments, this reorientation and spacing may include removing or adding information elements depending upon available space and orientation. Also notably, the second visual indicators 500A, 500B that were displayed in FIG. 5 have been replaced with the first visual indicators 406A, 406B.

The result is that it appears visually as if the second layer 400 has been magnetically attracted to and attached to the right edge 502 of the graphical user interface 300.

Figure 7:
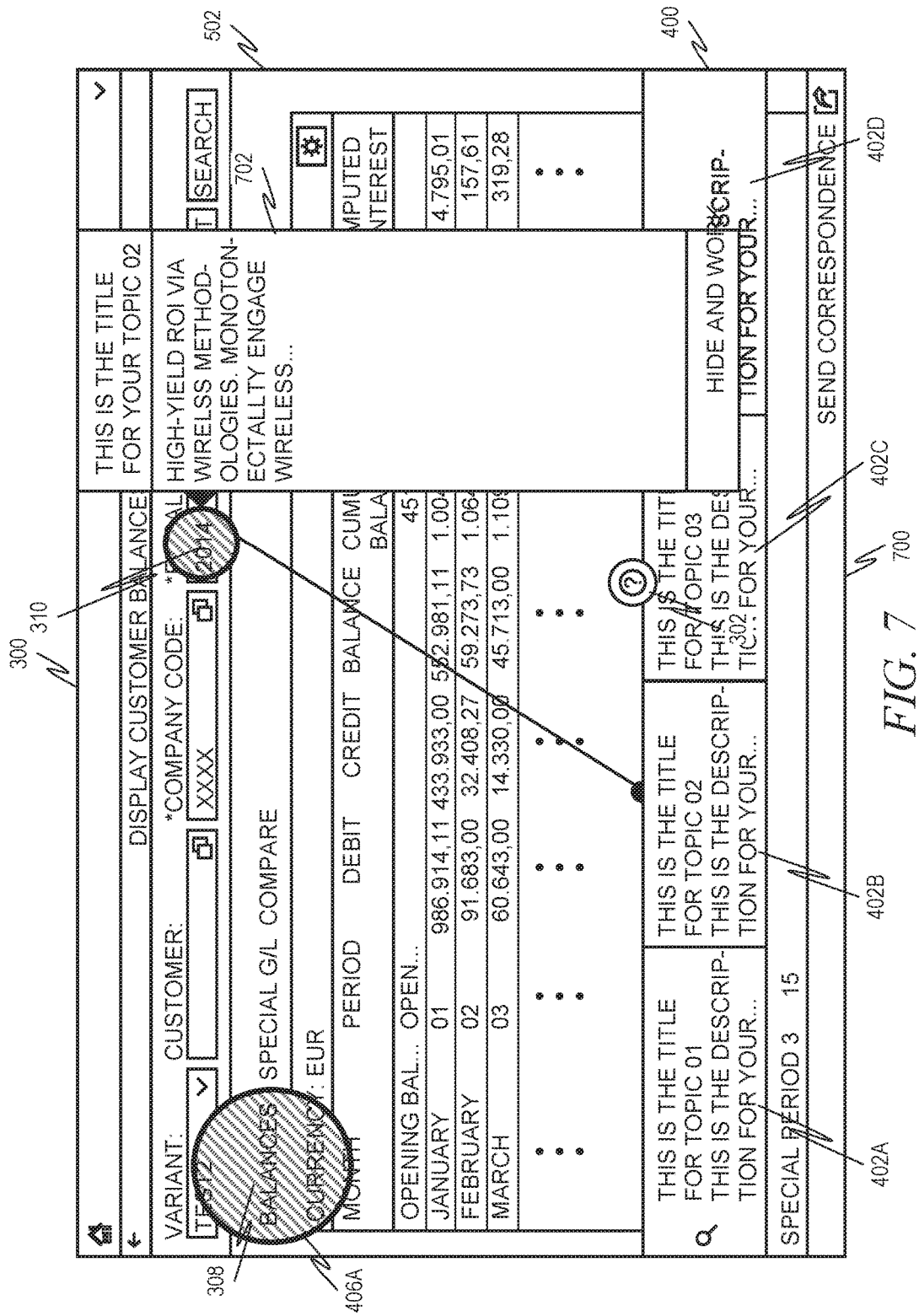
FIG. 7 is a screen capture illustrating the graphical user interface at a later time, when the user has selected an information element in the second layer, in accordance with an example embodiment.

FIG. 7 is a screen capture illustrating the graphical user interface 300 at a later time, when the user has selected an information element 402B in the second layer 400, in accordance with an example embodiment. Here, the second layer 400 is abutting a bottom edge 700 of the graphical user interface 300, indicating that at some point previously the user moved the first virtual button (not pictured) to a position that made it closer to the bottom edge 700 than to any other edge of the graphical user interface 300. As described earlier, the user has selected the information element 402B in the second layer 400, which causes the rendering of a third layer 702. This third layer 702 contains additional information regarding the information element 402B in the second layer 400.

Figure 8:
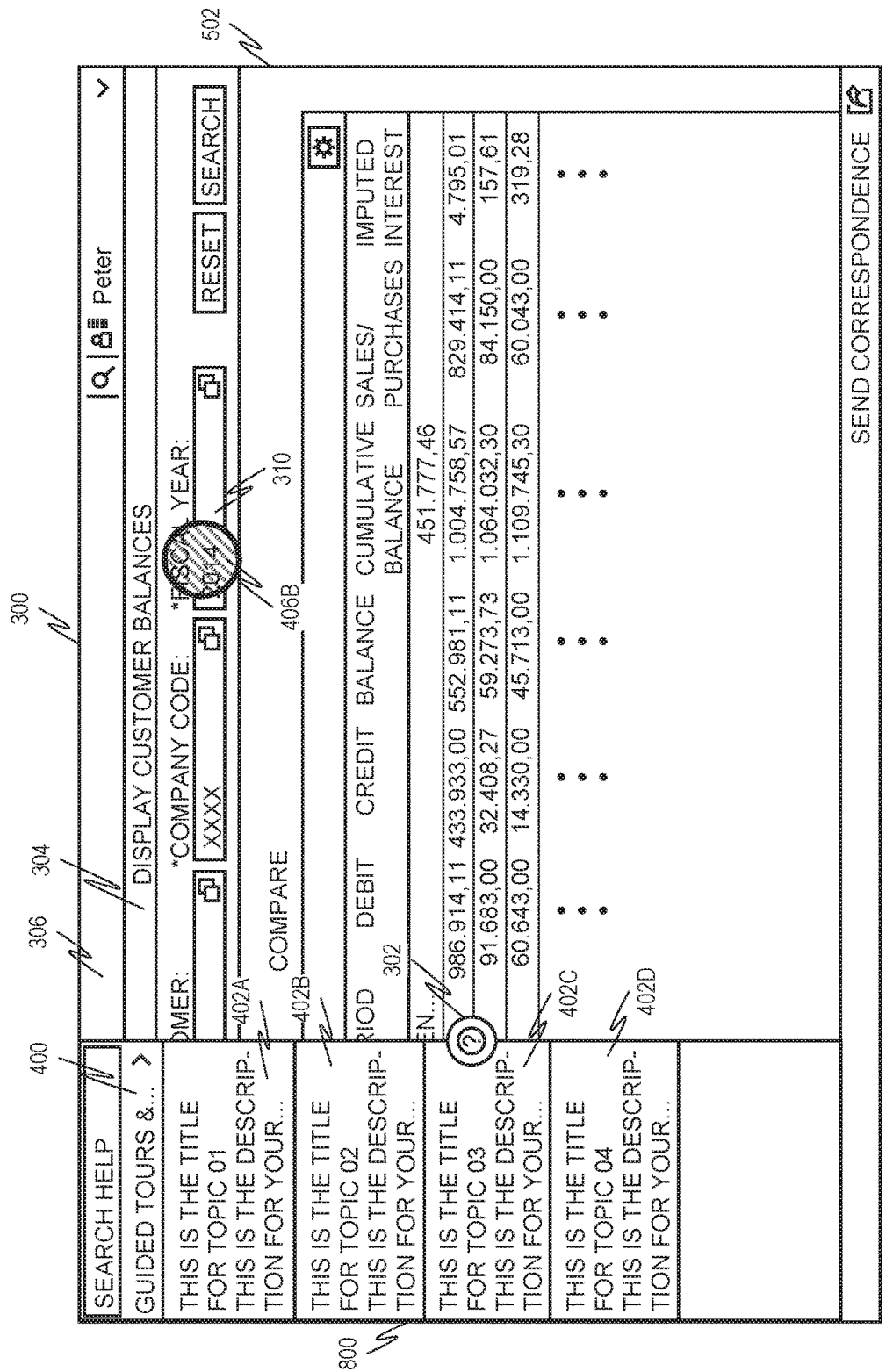
FIG. 8 is a screen capture illustrating the graphical user interface at a later time.

FIG. 8 is a screen capture illustrating the graphical user interface 300 at a later time. Here the second layer 400 is abutting a left edge 800 of the graphical user interface 300, indicating that the user has moved the first virtual button 302 to a position that made it closer to the left edge 800 than to any other edge of the graphical user interface 300.

FIG. 9 is a screen capture illustrating the graphical user interface 300 after the user has selected an area within the first layer 304, such as the piece of information 310. Here, the second layer 400 has been removed, and the first virtual button 302 is automatically moved to the left edge 800.

As described briefly above, the magnetic panel is not limited to Javascript or other web browser implementations. Embodiments are foreseen for any type of graphical user interface. Example uses include inline actions, table row level actions, simplified workflows, and user interfaces where space is a concern (e.g., mobile applications). Example graphical user interfaces include standalone application graphical user interfaces, where the methods described above may be designed into the application graphical user interface itself. Additionally, non-Javascript browser implementations are also foreseen where, for example, the magnetic panel is integrated into the web page itself or is part of a plug-in or other component of the web browser as opposed to being implemented in a scripting language.

In an example embodiment, an embodiment of the magnetic panel using UI5 is provided. UI5 (also sometimes known as OpenUI5 or SAPUI5) is a Javascript UI library comprising a feature-rich core and a large number of UI controls organized into libraries. The core includes aspects such as data bindings and models for different data sources, an efficient engine for creating and updating the code of the controls, support for a Model-View-Controller concept, support for declarative UI construction and templates, and automatic loading of appropriate language resources.

Here the code includes five different steps. In the first step, bootstrapping UI5 is provided, specifying the desired UI library, and configuring the process of bootstrapping to run asynchronously. Once the core and the corresponding resources have been loaded, the core fires an init event to signal that the library is ready and can be used.

In the second step, the UI5 controls are used. The code provided in this step actually performs function calls using the UI5 control that has been defined for the magnetic panel and first virtual button.

In the third step, XML is used to separate the view declaration from the controller logic. Inside the view, the declarative definition of the dynamic button is added with the same properties as in the second step. The XML tags are mapped to controls and the attributes are mapped to the properties of the controls.

In the fourth step, the controllers of the view are defined. Then, in the fifth step, data binding of two data or information sources together is performed. In this way, all changes in one source are also reflected in the other one. In data binding, a model instance and a binding instance are used. The model instance holds the data and provides methods to set the data or to retrieve the data from a server. It also provides a method for creating bindings to the data. When this method is called, a binding instance is created, which contains the binding information and provides an event, which is fired whenever the bound data changes. An element can listen to this event and update its visualization according to the new data. The UI uses data binding to bind controls to the model which holds the application data, so that the controls are updated automatically whenever application data changes.

In another example embodiment, a hybrid mobile app can be developed with the magnetic panel and first virtual button using the SAPUI5 Framework. This hybrid mobile app may include a native app wrapper (e.g., PhoneGap) and an HTML viewer to display the content on the user interface. Hybrid apps have the benefit of allowing publication in app stores; also, because the application code is embedded in the hybrid app and the library files in the hybrid container, the user needs to install the files only once and does not need to download them every time the application is started. Of course, since the library is installed on the user device, the library size is important, whereas in web applications the library is deployed on the server and the user device only needs to download the desired parts of the library at runtime.

Figure 10:
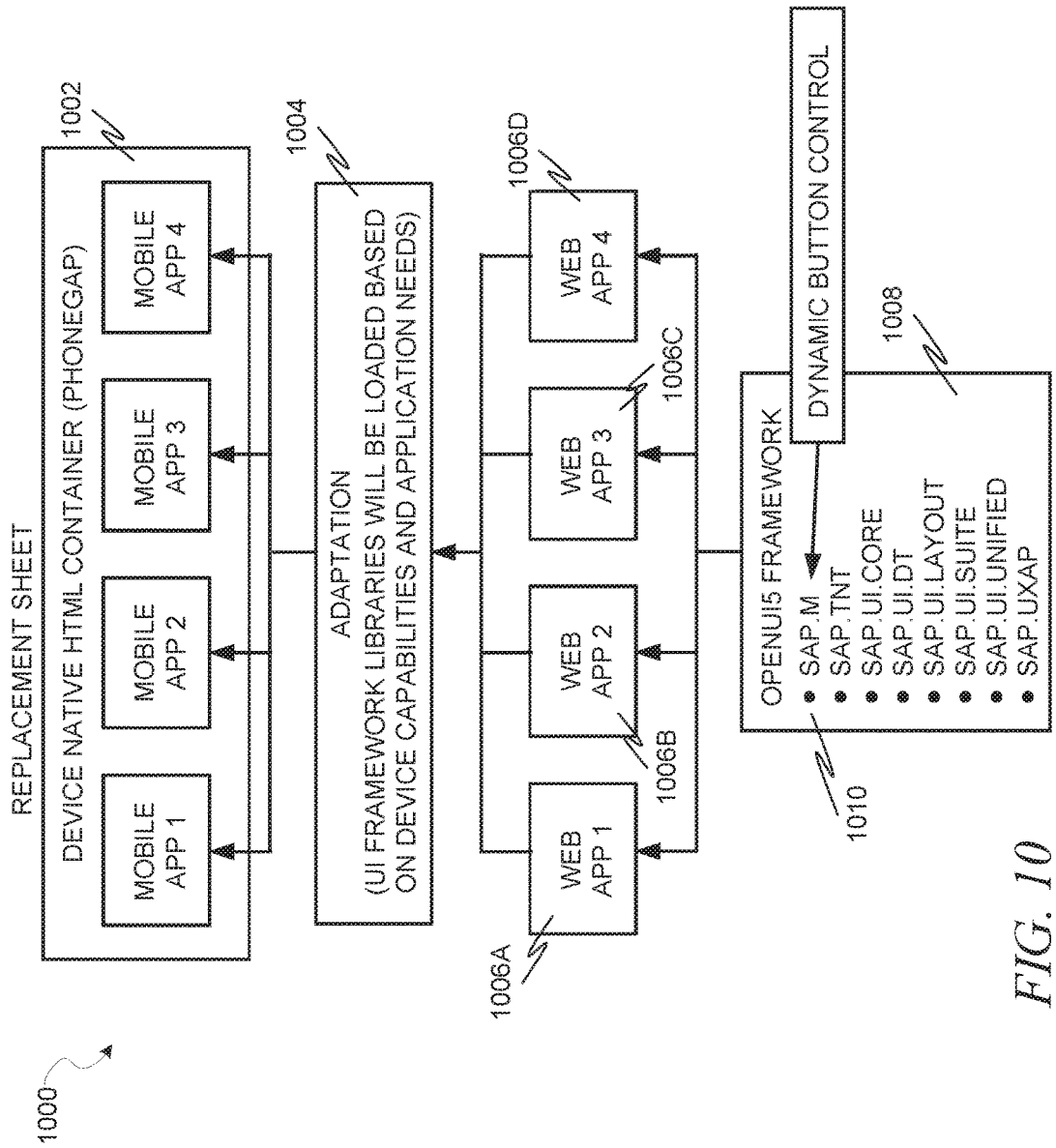
FIG. 10 is a block diagram illustrating a hybrid mobile app including a dynamic button control, in accordance with an example embodiment.

FIG. 10 is a block diagram illustrating a hybrid mobile app 1000 including a dynamic button control, in accordance with an example embodiment. The hybrid mobile app 1000 includes a device native HTML container 1002, such as PhoneGap, an adaptation layer 1004, and multiple apps 1006A-1006D that all utilize an OpenUI5 Framework 1008 that includes a dynamic button control 1010.

In another example embodiment, a magnetic panel control may be developed to extend the UI5 framework. In another example embodiment, a watch application can be deployed that contains the magnetic panel. A watch app target can be, for example, added to an existing iOS™ target, or a new iOST™ project can be created that includes a watch app. In both cases, Xcode automatically configures the watch app and WatchKit extension bundles and their initial resources. Those bundles are then delivered as part of an iOS™ app on an App Store.

EXAMPLES

Example 1

A system comprising:
an operating system executing by a hardware processor; and
a graphical user interface configured to:
  render a first graphical layer having a plurality of edges, the first graphical layer including a first virtual button rendered at a default location and one or more pieces of information;
  detect a user input of selecting the first virtual button and moving the first virtual button to a new location other than the default location; and
  in response to the detecting:
    compare the new location to each of the plurality of edges to determine a geometrically closest edge to the new location; and
    render a second graphical layer on top of the first graphical layer, the second graphical layer abutting the geometrically closest edge to the new location.

Example 2

The system of Example 1, wherein the graphical user interface is further configured to automatically move the first virtual button from the new location to an edge of the second graphical layer opposite the geometrically closest edge of the first graphical layer.

Example 3

The system of either of Examples 1 or 2, wherein the second graphical layer includes one or more information elements and the graphical user interface is further configured to render a first visual indicator over any of the one or more pieces of information in the first graphical layer that are related to the one or more information elements in the second graphical layer while the first virtual button is being moved to the new location.

Example 4

The system of Example 3, wherein the graphical user interface is further configured to alter the first visual indicator to a second visual indicator once the moving of the first virtual button to the new location is complete.

Example 5

The system of any of Examples 1-4, wherein the graphical user interface is further configured to detect a user input of selecting one of the one or more pieces of information in the first graphical layer and, in response to the detection of the user input of selecting one of the one or more pieces of information in the first graphical layer, hide the second graphical layer.

Example 6

The system of Example 5, wherein the hiding of the second graphical layer includes deleting the second graphical layer.

Example 7

The system of any of Examples 1-6, wherein the graphical user interface is further configured to detect a user input of selecting the first virtual button but not moving the first virtual button to a new location and, in response to the detecting of the user input of selecting the first virtual button but not moving the first virtual button to a new location, hide the second graphical layer.

Example 8

The system of any of Examples 1-7, wherein the graphical user interface is further configured to detect a user input of selecting the first virtual button and moving the first virtual button to another new location and, in response to the detecting of the user input of selecting the first virtual button and moving the first virtual button to another new location:
  compare the another new location to each of the plurality of edges to determine a geometrically closest edge to the another new location; and
  re-render the second graphical layer on top of the first graphical layer, the second graphical layer abutting the geometrically closest edge to the another new location.

Example 9

A method comprising:
rendering a first graphical layer having a plurality of edges in a graphical user interface, the first graphical layer including a first virtual button rendered at a default location and one or more pieces of information;

detecting a user input of selecting the first virtual button and moving the first virtual button to a new location other than the default location; and in response to the detecting:

comparing the new location to each of the plurality of edges to determine a geometrically closest edge to the new location; and rendering a second graphical layer on top of the first graphical layer, the second graphical layer abutting the geometrically closest edge to the new location.

Example 10

The method of Example 9, further comprising automatically moving the first virtual button from the new location to an edge of the second graphical layer opposite the geometrically closest edge of the first graphical layer.

Example 11

The method of Examples 9 or 10; wherein the second graphical layer includes one or more information elements and the method further comprises rendering a first visual indicator over any of the one or more pieces of information in the first graphical layer that are related to the one or more information elements in the second graphical layer while the first virtual button is being moved to the new location.

Example 12

The method of Example 11, further comprising altering the first visual indicator to a second visual indicator once the moving of the first virtual button to the new location is complete.

Example 13

The method of any of Examples 9-12, further comprising detecting a user input of selecting one of the one or more pieces of information in the first graphical layer and, in response to the detection of the user input of selecting one of the one or more pieces of information in the first graphical layer, hiding the second graphical layer.

Example 14

The method of Example 13, further comprising detecting a user input of selecting the first virtual button but not moving the first virtual button to a new location and, in response to the detecting of the user input of selecting the first virtual button but not moving the first virtual button to a new location, hiding the second graphical layer.

Example 15

A non-transitory machine-readable storage medium comprising instructions which, when implemented by one or more machines, cause the one or more machines to perform operations comprising:

rendering a first graphical layer having a plurality of edges in a graphical user interface, the first graphical layer including a first virtual button rendered at a default location and one or more pieces of information;

detecting a user input of selecting the first virtual button and moving the first virtual button to a new location other than the default location; and in response to the detecting:

comparing the new location to each of the plurality of edges to determine a geometrically closest edge to the new location; and rendering a second graphical layer on top of the first graphical layer, the second graphical layer abutting the geometrically closest edge to the new location.

Example 16

The non-transitory machine-readable storage medium of Example 15, wherein the operations further comprise automatically moving the first virtual button from the new location to an edge of the second graphical layer opposite the geometrically closest edge of the first graphical layer.

Example 17

The non-transitory machine-readable storage medium of Examples 15 or 16, wherein the second graphical layer includes one or more information elements and the operations further comprise rendering a first visual indicator over any of the one or more pieces of information in the first graphical layer that are related to the one or more information elements in the second graphical layer while the first virtual button is being moved to the new location.

Example 18

The non-transitory machine-readable storage medium of Example 17, wherein the operations further comprise altering the first visual indicator to a second visual indicator once the moving of the first virtual button to the new location is complete.

Example 19

The non-transitory machine-readable storage medium of any of examples 15-18, wherein the operations further comprise detecting a user input of selecting one of the one or more pieces of information in the first graphical layer and, in response to the detection of the user input of selecting one of the one or more pieces of information in the first graphical layer, hiding the second graphical layer.

Example 20

The non-transitory machine-readable storage medium of any of examples 15-19, wherein the operations further comprise detecting a user input of selecting the first virtual button but not moving the first virtual button to a new location and, in response to the detecting of the user input of selecting the first virtual button but not moving the first virtual button to a new location, hiding the second graphical layer.

MODULES, COMPONENTS, AND LOGIC

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-10 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 11:
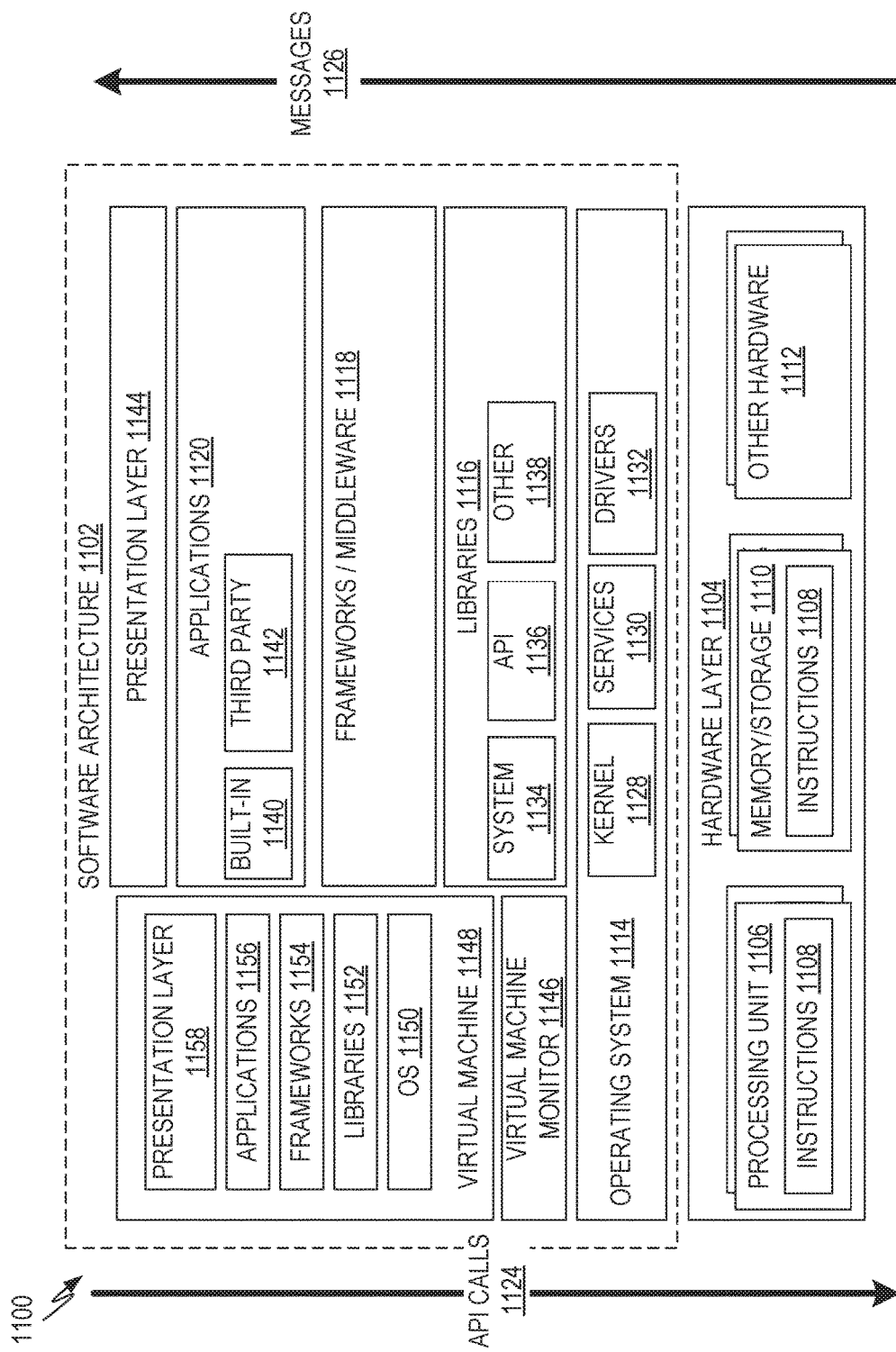
FIG. 11 is a block diagram illustrating a representative software architecture, which may be used in conjunction with various hardware architectures herein described.

FIG. 11 is a block diagram 1100 illustrating a representative software architecture 1102, which may be used in conjunction with various hardware architectures herein described. FIG. 11 is merely a non-limiting example of a software architecture 1102, and it will be appreciated that many other architectures may be implemented to facilitate the functionality described herein. The software architecture 1102 may be executing on hardware such as a machine 1200 of FIG. 12 that includes, among other things, processors 1210, memory/storage 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. The executable instructions 1108 represent the executable instructions of the software architecture 1102, including implementation of the methods, modules, and so forth of FIGS. 1-10. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the machine 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature, and not all software architectures have all layers. For example, some mobile or special purpose operating systems may not provide a frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130, and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 may provide a higher-level common infrastructure that may be utilized by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system 1114 or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. The third-party applications 1142 may include any of the built-in applications 1140 as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1142 may invoke the API calls 1124 provided by the mobile operating system such as the operating system 1114 to facilitate functionality described herein.

The applications 1120 may utilize built-in operating system functions (e.g., kernel 1128, services 1130, and/or drivers 1132), libraries (e.g., system libraries 1134, API libraries 1136, and other libraries 1138), and frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures utilize virtual machines. In the example of FIG. 11, this is illustrated by a virtual machine 1148. The virtual machine 1148 creates a software environment where the applications 1120 and modules can execute as if they were executing on a hardware machine (such as the machine 1200 of FIG. 12, for example). The virtual machine 1148 is hosted by a host operating system (operating system 1114 in FIG. 11) and typically, although not always, has a virtual machine monitor 1146, which manages the operation of the virtual machine 1148 as well as the interface with the host operating system (i.e., operating system 1114). A software architecture executes within the virtual machine 1148, such as an operating system 1150, libraries 1152, frameworks/middleware 1154, applications 1156, and/or a presentation layer 1158. These layers of software architecture executing within the virtual machine 1148 can be the same as corresponding layers previously described or may be different.

Example Machine Architecture and Machine-Readable Medium

Figure 12:
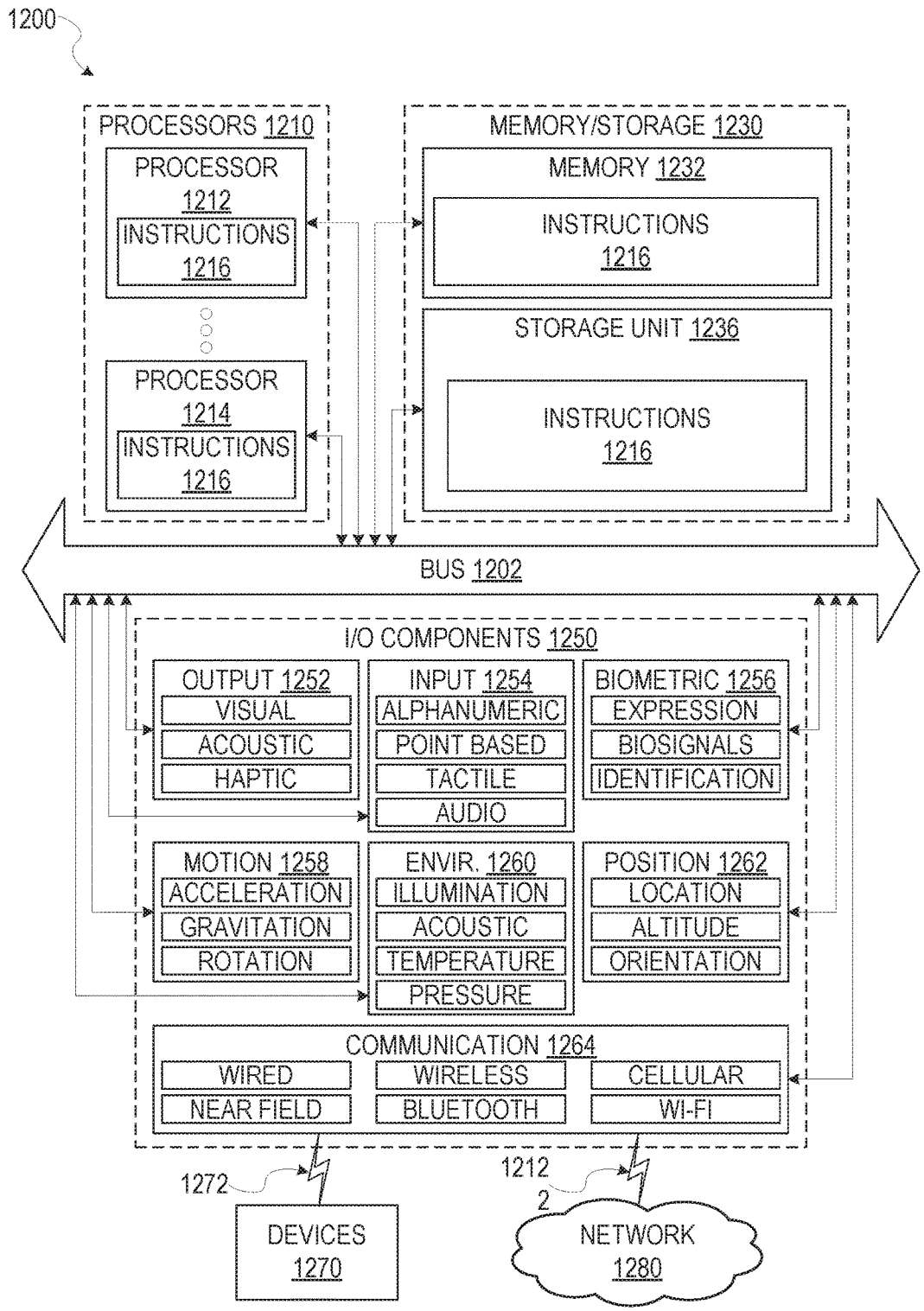
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions 1216 from a machine-readable medium (e.g., a machine-readable storage medium) and perform any one or more of the methodologies discussed herein. Specifically, FIG. 12 shows a diagrammatic representation of the machine 1200 in the example form of a computer system, within which the instructions 1216 (e.g., software, a program, an application 1120, an applet, an app, or other executable code) for causing the machine 1200 to perform any one or more of the methodologies discussed herein may be executed. For example, the instructions 1216 may cause the machine 1200 to execute the flow diagram of FIG. 2. Additionally, or alternatively, the instructions 1216 may implement modules of FIG. 1, and so forth. The instructions 1216 transform the general, non-programmed machine 1200 into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1212 and a processor 1214 that may execute the instructions 1216. The term "processor" is intended to include a multi-core processor 1212, 1214 that may comprise two or more independent processors 1212, 1214 (sometimes referred to as "cores") that may execute the instructions 1216 contemporaneously. Although FIG. 12 shows multiple processors 1210, the machine 1200 may include a single processor 1212, 1214 with a single core, a single processor 1212, 1214 with multiple cores (e.g., a multi-core processor 1212, 1214), multiple processors 1212, 1214 with a single core, multiple processors 1212, 1214 with multiple cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor 1212, 1214's cache memory), or any suitable combination thereof, during execution thereof by the machine 1200. Accordingly, the memory 1232, the storage unit 1236, and the memory of the processors 1210 are examples of machine-readable media.

As used herein, "machine-readable medium" means a device able to store the instructions 1216 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine 1200 will depend on the type of machine 1200. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272 respectively. For example, the communication components 1264 may include a network interface component or other suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a hardware processor;
an operating system executing by the hardware processor; and
a graphical user interface executing on the operating system and configured to perform operations comprising:
rendering a first graphical layer having a plurality of edges, the first graphical layer including a first virtual button rendered at a default location and one or more pieces of information;
detecting a user input of selecting the first virtual button and moving the first virtual button to a new location other than the default location; and
in response to the detecting:
compare the new location to each of the plurality of edges to determine a geometrically closest edge to the new location;
rendering a second graphical layer on top of the first graphical layer, the second graphical layer abutting the geometrically closest edge to the new location, wherein the second graphical layer includes one or more information elements; and
rendering a first visual indicator over any of the one or more pieces of information in the first graphical layer that are related to the one or more information elements in the second graphical layer while the first virtual button is being moved to the new location.

2. The system of claim 1, wherein the graphical user interface is further configured to automatically move the first virtual button from the new location to an edge of the second graphical layer opposite the geometrically closest edge of the first graphical layer.

3. The system of claim 1, wherein the graphical user interface is further configured to alter the first visual indicator to a second visual indicator once the moving of the first virtual button to the new location is complete.

4. The system of claim 1, wherein the graphical user interface is further configured to detect a user input of selecting one of the one or more pieces of information in the first graphical layer and, in response to the detection of the user input of selecting one of the one or more pieces of information in the first graphical layer, hide the second graphical layer.

5. The system of claim 4, wherein the hiding of the second graphical layer includes deleting the second graphical layer.

6. The system of claim 1; wherein the graphical user interface is further configured to detect a user input of selecting the first virtual button but not moving the first virtual button to a new location and, in response to the detecting of the user input of selecting the first virtual button but not moving the first virtual button to a new location, hide the second graphical layer.

7. The system of claim 1, wherein the graphical user interface is further configured to detect a user input of selecting the first virtual button and moving the first virtual button to another new location and, in response to the detecting of the user input of selecting the first virtual button and moving the first virtual button to another new location:
compare the another new location to each of the plurality of edges to determine a geometrically closest edge to the another new location; and
re-render the second graphical layer on top of the first graphical layer, the second graphical layer abutting the geometrically closest edge to the another new location.

8. A method comprising:
rendering, using one or more hardware processors, a first graphical layer having a plurality of edges in a graphical user interface, the first graphical layer including a first virtual button rendered at a default location and one or more pieces of information;
detecting a user input of selecting the first virtual button and moving the first virtual button to a new location other than the default location; and
in response to the detecting:
comparing, using one or more hardware processors, the new location to each of the plurality, of edges to determine a geometrically closest edge to the new location;
rendering a second graphical layer on top of the first graphical layer, the second graphical layer abutting the geometrically closest edge to the new location, wherein the second graphical layer includes one or more information elements; and
rendering a first visual indicator over any of the one or more pieces of information in the first graphical layer that are related to the one or more information elements in the second graphical layer while the first virtual button is being moved to the new location.

9. The method of claim 8, further comprising automatically moving the first virtual button from the new location to an edge of the second graphical layer opposite the geometrically closest edge of the first graphical layer.

10. The method of claim 8, further comprising altering the first visual indicator to a second visual indicator once the moving of the first virtual button to the new location is complete.

11. The method of claim 8, further comprising detecting a user input of selecting one of the one or more pieces of information in the first graphical layer and, in response to the detection of the user input of selecting one of the one or more pieces of information in the first graphical layer, hiding the second graphical layer.

12. The method of claim 8, further comprising detecting a user input of selecting the first virtual button but not moving the first virtual button to a new location and, in response to the detecting of the user input of selecting the first virtual button but not moving the first virtual button to a new location, hiding the second graphical layer.

13. A non-transitory machine-readable storage medium comprising instructions which, when implemented by one or more machines, cause the one or more machines to perform operations comprising:

rendering, using one or more hardware processors, a first graphical layer having a plurality of edges in a graphical user interface, the first graphical layer including a first virtual button rendered at a default location and one or more pieces of information;

detecting a user input of selecting the first virtual button and moving the first virtual button to a new location other than the default location; and in response to the detecting:

comparing, using one or more hardware processors, the new location to each of the plurality, of edges to determine a geometrically closest edge to the new location;

rendering a second graphical layer on top of the first graphical layer, the second graphical layer abutting the geometrically closest edge to the new location, wherein the second graphical layer includes one or more information elements; and rendering a first visual indicator over any of the one or more pieces of information in the first graphical layer that are related to the one or more information elements in the second graphical layer while the first virtual button is being moved to the new location.

14. The non-transitory machine-readable storage medium of claim 13, wherein the operations further comprise automatically moving the first virtual button from the new location to an edge of the second graphical layer opposite the geometrically closest edge of the first graphical layer.

15. The non-transitory machine-readable storage medium of claim 13, wherein the operations further comprise altering the first visual indicator to a second visual indicator once the moving of the first virtual button to the new location is complete.

16. The non-transitory machine-readable storage medium of claim 13, wherein the operations further comprise detecting a user input of selecting one of the one or more pieces of information in the first graphical layer and, in response to the detection of the user input of selecting one of the one or more pieces of information in the first graphical layer, hiding the second graphical layer.

17. The non-transitory machine-readable storage medium of claim 13, wherein the operations further comprise detecting a user input of selecting the first virtual button but not moving the first virtual button to a new location and, in response to the detecting of the user input of selecting the first virtual button but not moving the first virtual button to a new location, hiding the second graphical layer.

* * * * *